3,819,828
ANHYDROUS HAIR TREATING PRODUCT CONTAINING A MONOPERSULFATE SALT
Bobby Ray McCoy, Hamilton, Ohio, assignor to The Procter & Gamble Company, Cincinnati, Ohio
No Drawing. Filed Feb. 16, 1973, Ser. No. 333,237
Int. Cl. A61k 7/10
U.S. Cl. 424—71                                    9 Claims

ABSTRACT OF THE DISCLOSURE

An anhydrous water dispersible composition comprising a monopersulfate salt of the formula $MHSO_5$, wherein M is an alkali metal cation; a compatible organic diluent; and a compatible alkaline buffering material to adjust the pH of aqueous solutions containing this composition to within the range of from about 7 to about 11, said anhydrous composition desirably including a compatible surfactant selected from the group consisting of soaps and anionic, semipolar nonionic, amphoteric, and zwitterionic synthetic surfactants.

BACKGROUND OF THE INVENTION

(1) Field of the Invention

This invention relates to a product useful in treating hair according to the process disclosed in the copending application of Eugene Zeffren and Jerry Turner, Ser. No. 294,053, filed Oct. 2, 1972, entitled "Permanent Waving Composition Based on Non-Bleaching Oxidant and pH Control Agent," said application being specifically incorporated herein by reference. As disclosed in the above application, it is desirable to form the aqueous solution of the monopersulfate salt immediately before applying it to the hair. For this purpose, it is disclosed that a two component kit is a desirable embodiment.

(2) Description of the Prior Art

The above-mentioned application constitues the closest prior art, being a disclosure of the treatment of hair with a monopersulfate compound of this invention. However, there is no disclosure in the above application of the desirability of preparing a composition which is anhydrous and which contains certain materials compatible with a monopersulfate salt.

SUMMARY OF THE INVENTION

This invention relates to a novel anhydrous, water dispersible, hair treating composition comprising from about 0.5% to about 10% by weight of an oxidant having the formula $MHSO_5$ wherein M is an alkali metal cation; from about 0.5% to about 15% of a compatible alkaline buffer; and from about 15% to about 99% of a compatible nonionic organic diluent selected from the group consisting of saturated hydrocarbons, saturated fluorohydrocarbons, saturated primary alcohols, saturated esters of alcohols and fatty acids where said alcohols contain from 1 to 6 hydroxy groups, saturated polyoxyalkylene ethers of alcohols containing from 1 to 6 hydroxy groups, and mixtures thereof, the pH of said composition when it is added to water being from about 7 to about 11. As used herein, "water dispersible" includes "water-soluble."

DETAILED DESCRIPTION OF THE INVENTION

(1) The Oxidant

The oxidizing agents used in the present product are water-soluble monopersulfate salts of the formula $MHSO_5$ wherein M is an alkali metal cation, e.g., lithium, sodium, potassium, rubidium or cesium. The nature of the alkali metal cation is not essential to the present invention inasmuch as all such salts are water-soluble, and it is the monopersulfate anion which is the active oxidizing species in solution. However, the monopersulfate salts wherein M is potassium are available under the trade name "Oxone" as a complex salt believed to have the formula $2KHSO_5$—$KHSO_4$—$K_2SO_4$ and this commercial product is preferred herein because of this commercial availability and the stability of the "Oxone." The other alkali metal monopersulfate salts can be prepared, for example, by ion exchange reactions with the potassium salt or by neutralization of the corresponding acid with the appropriate alkali metal hydroxide.

The foregoing monopersulfate salts are employed in the present product in an amount to provide from about 0.5% to about 10%, preferably from about 2% to about 10%, and most preferably from about 5% to about 10%, by weight of said $MHSO_5$ species. Less than about 0.5% of said monopersulfate salt should not be used, since insufficient modification of the hair will result; and above about 10% of said monopersulfate salt, the composition can cause skin irritation.

The particle size of the monopersulfate salt can vary from about 1 micron to about 840 microns, preferably from about 15 microns to about 100 microns. The smaller particle sizes are desirable since they remain suspended in the organic material more readily.

(2) The Organic Diluent

The organic material which provides the major portion of the product of this invention is selected for its limited reactivity with the oxidizing material and, desirably, for its cosmetic properties. Its primary function is to support the oxidizing material and other desired adjuncts in the proper concentrations in a single composition having a desirable form which facilitates the preparation of aqueous solutions according to the teachings of the Zeffren and Turner application referred to hereinbefore.

The organic diluent can be either a liquid or a soft wax, preferably a liquid. As used herein, "saturated" is intended to include compounds containing aryl as well as saturated alkyl moieties. "Polyoxyalkylene" as used herein includes ethoxylated and propoxylated materials.

The organic diluent can desirably be a nonionic synthetic detergent of the ethoxylated nonionic type. Nonionic synthetic detergents can be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements. Another class has semipolar characteristics. Preferred classes of nonionic synthetic detergents are as follows:

1. A class of nonionic synthetic detergents under the tradename of "Pluronic." These compounds are formed by condensing ethylene oxide with a hydrophobic base formed by the condensation of propylene oxide with propylene glycol. The hydrophobic portion of the molecule which, of course, exhibits water insolubility, has a molecular weight of from about 1,500 to 1,800. The addition of polyoxyethylene radicals to this hydrophobic portion tends to increase the water solubility of the molecule as a whole and the liquid character of the product is retained up to the point where the polyoxyethylene content is about 50 percent of the total weight of the condensation product.

2. The polyethylene oxide condensates of alkyl phenols, e.g., the condensation products of alkyl phenols having an alkyl group containing from about 6 to 12 carbon atoms in either a straight-chain or branched-chain configuration with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

3. Those nonionoic synthetic detergents derived from the condensation of ethylene oxide with the product resulting from the reaction of propylene oxide and ethylene diamine. For example, compounds containing from about 40 percent to about 80 percent polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000 are satisfactory.

4. The condensation product of aliphatic alcohols having from 8 to 22 carbon atoms, in either straight-chain or branched-chain configuration, with ethylene oxide, e.g., a coconut alcohol ethylene oxide condensate having from 5 to 40 moles of ethylene oxide per mole of coconut alcohol, the coconut alcohol fraction having from 10 to 14 carbon atoms.

Other preferred organic diluents include ethanol, coconut fatty alcohol, lauryl alcohol, cetyl alcohol, acetate esters wherein the alcohol group contains from 2 to about 18 carbon atoms and from 1 to about 6 hydroxy groups, mineral oil having a viscosity at 75° F. of from about 50 to about 700 Saybolt Seconds Furol (SSF), and saturated triglycerides of $C_8$–$C_{18}$ fatty acids. Organic diluents having emollient properties are especially desirable.

(3) Alkaline Buffer

In addition to the oxidizing material and the organic material disclosed hereinbefore, it is highly desirable to include in the compositions of this invention from about 0.5% to about 15% of a compatible alkaline buffer material to adjust the pH of the aqueous hair treating compositions prepared using the product of this invention to within the range of from about 7 to about 11. Although solution pH's greater than 11 can be used, such high pH's are unduly irritating to normal skin and are preferably avoided. A solution pH of from about 8.5 to 9 is preferred. Suitable alkaline buffer materials include alkali metal and alkaline earth metal hydroxides, carbonates, bicarbonates, phosphates (including polyphosphates such as pyro- and tripolyphosphates), and borates. It is desired that there be sufficient buffer present to maintain the eventual aqueous solution in the proper pH range. Prefererably from about 2% to about 10% of the alkaline buffer is included in the product of this invention.

Any of the common organic and inorganic buffer salt combinations capable of establishing a pH within the range from about 7 to about 11 are suitable for use in conjunction with the oxidizing agents herein. Exemplary buffers suitable for use herein include, for example, sodium hydroxide plus sodium borate; sodium hydrogen phosphate plus potassium dihydrogen phosphate; and phosphate buffers prepared in the the manner fully described in "Hawk's Physiological Chemistry," Oser, Ed. 14, pp. 41–43, McGraw-Hill (1965).

While any of the common buffers suitable for use in this pH range can be employed for the purpose, it has been discovered that carbonated-bicarbonated buffers are most preferred herein. Presumably, carbonated-bicarbonated buffer mixtures employed in conjunction with the alkali metal monopersulfate serve both as a pH buffer and in some way promote the softening of the hair, or otherwise, allow the monopersulfate to interact with the keratin in optimal fashion. Irrespective of the actual mechanism, it has been found that compositions employing the monopersulfate salt dissolved in aqueous carbonated-bicarbonated buffers in therange from 7 to 11, preferably 8.5 to 9, are preferred for use herein. The preferred and normal particle size ranges for the alkaline buffer are the same as for the monopersulfate oxidant.

(4) Surface-Active Agents

In addition to the above ingredients, it is desirable to have present from about 5% to about 50%, preferably from about 10% to about 20% of a water-soluble organic detergent compound which can be a soap or an anionic, amphoteric, or zwitterionic synthetic detergent, or mixtures thereof, exemplified as follows:

a. Water-soluble soaps: Examples of suitable soaps for use in this invention are the sodium, potassium, ammonium and alkanol ammonium (e.g., triethanolammonium) salts of higher fatty acids containing from about 10 to about 22 carbon atoms. Particularly useful are the sodium and potassium salts of the mixture of fatty acids derived from coconut oil and tallow, i.e., sodium and potassium tallow and coconut soap.

b. Anionic synthetic nonsoap detergents, a preferred class, can be broadly described as the water-soluble salts, particularly the alkali metal salts, of organic sulfuric reaction products having in their molecular structure an alkyl radical containing from about 8 to about 22 carbon atoms and a radical selected from the group consisting of sulfonic acid and sulfuric acid ester radicals. (Included in the term alkyl is the alkyl portion of higher acyl radicals.) Important examples of the synthetic deteregnts which form a part of the preferred compositions of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, including those of the types described in U.S. Pat. Nos. 2,220,099 and 2,477,383 (the alkyl radical can be a straight or branched aliphatic chain); sodium alkyl glyceryl ether sulfonates, especially those ethers of the higher alcohols derived from tallow ad coconut oil; sodium coconut oil fatty acid monoglyceride sulfates and sulfonates; sodium or potassium salts or sulfuric acid esters of the reaction porduct of one mole of a higher fatty alcohol (e.g., tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain from 8 to about 12 carbon atoms; the reaction product of fatty acids esterified with isethionic acid and neutralized with sodium hydroxide where, for example, the fatty acids are derived from coconut oil; sodium or potassium salts of fatty acid amide of a methyl tauride in which the fatty acids, for example, are derived from coconut oil; and others known in the art, a number specifically set forth in U.S. Pat. Nos. 2,486,921, 2,486,922 and 2,396,278. Other important anionic detergents, sulfonated olefins, are described in the U.S. Pat. No. 3,332,880 to Phillip E. Pflaumer and Adrian Kessler issued July 25, 1967.

c. Semipolar nonionic synthetic detergents:

1. Long chain tertiary amine oxides corresponding to the following general formula

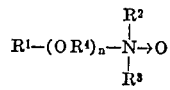

wherein $R^1$ is an alkyl radical of from about 8 to about 24 carbon atoms, $R^2$ and $R^3$ are each methyl, ethyl or hydroxyethyl radicals, $R^4$ is ethylene, and $n$ equals from 0 to about 10. The arrow in the formula is a conventional representation of a semipolar bond. Specific examples of amine oxide detergents include: Dimethyldodecylamine oxide; cetyldimethylamine oxide; bis-(2-hydroxyethyl)- dodecylamine oxide; bis-(hydroxyethyl)-3-dodecoxy-1-hydroxypropyl amine oxide.

2. Long chain tertiary phosphine oxides corresponding to the following general formula RR′R″P→O wherein R is an alkyl, alkenyl or monohydroxyalkyl radical ranging from 10 to 24 carbon atoms in chain length and R′ and R″ are each alkyl or monohydroxyalkyl groups containing from 1 to 3 carbon atoms. The arrow in the formula is the conventional representation of a semipolar bond. Examples of suitable phosphine oxides are found in U.S. Pat. No. 3,304,263 of Feb. 14, 1967, and include: Dimethyldodecylphosphine oxide; diethyldodecylphosphine oxide; dimethyl-(2-hydroxydodecyl) phosphine oxide.

3. Long chain sulfoxides having the formula

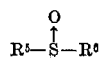

wherein $R^5$ is an alkyl radical containing from about 10 to about 28 carbon atoms, from 0 to about 5 ether linkages and from 0 to about 2 hydroxyl substituents, at least 1 moiety of $R^5$ being an alkyl radical containing 0 ether linkages and containing from about 10 to about 18 carbon atoms, and wherein $R^6$ is an alkyl radical containing from 1 to 3 carbon atoms and from 1 to 2 hydroxyl groups. Specific examples of these sulfoxides are: Dodecylmethyl sulfoxide; 3-hydroxytridecylmethyl sulfoxide; 3-methoxytridecylmethyl sulfoxide; 3-hydroxy-4-dodecoxybutylmethyl sulfoxide.

d. Amphoteric synthetic detergents can be broadly described as derivatives of aliphatic secondary and tertiary amines, in which the aliphatic radical may be straight-chain or branched and wherein 1 of the aliphatic substituents contains from about 8 to 18 carbon atoms and 1 contains an anionic water-solubilizing group, e.g., carboxy, sulfo, sulfato, phosphato, or phosphono. Examples of compounds falling within this definition are sodium-3-dodecylaminopropionate and sodium-3-dodecylaminopropane sulfonate.

e. Zwitterionic synthetic detergents can be broadly described as derivatives of aliphatic quaternary ammonium, phosphonium, and sulfonium compounds, in which the aliphatic radical may be straight-chain or branched, and wherein one of the aliphatic substituents contains from about 8 to 18 carbon atoms and one contains an anionic water-solubilizing group, e.g., carboxy, sulfo, sulfato, phosphato, or phosphono. Examples of compounds falling within this definition are 3-(N,N-dimethyl-N-hexadecylammonio)propane-1-sulfonate and 3-(N,N-dimethyl-N-hexadecylammonio)2-hydroxy propane-1-sulfonate which are especially preferred for the excellent cool water detergency characteristics. See, for example, Snoddy et al., Canadian Pat. No. 708,148 issued Apr. 20, 1965.

Preferred detergents for use in the compositions of the invention include sodium alkyl ($C_8$–$C_{16}$) sulfate, sodium alkyl ($C_8$–$C_{16}$) glyceryl ether sulfonate, sodium N-acyl ($C_8$–$C_{16}$) sarcosinate, and sodium N-acyl ($C_8$–$C_{16}$) N-methyl tauride. Also suitable are the 3-(N,N-dimethyl-N-alkylammonio)-2-hydroxypropane-1-sulfonates wherein the alkyl has from 8 to 22 carbon atoms, e.g., 3-(N,N-dimethyl - N - coconutalkylammonio)-2-hydroxypropane-1-sulfonate and the 3-(N,N-dimethyl-N-alkylammonio) propane-1-sulfonates wherein the alkyl has from 8 to 22 carbon atoms, e.g., 3-(N,N-dimethyl-N-hexadecylammonio)propane-1-sulfonate. These detergents are especially suitable herein by reason of their excellent cleaning properties and ready availability.

Suitable combinations of organic materials and surfactants are also described in the copending application of Melvin A. Barbera, Ser. No. 324,709, filed Jan. 22, 1973, entitled "Foaming and Conditioning Detergent Compositions," said application being specifically incorporated herein by reference.

In addition to the above components, the compositions of this invention can contain other normal ingredients including gelling agents such as finely divided silica, high molecular weight polyoxyethylenes, carboxymethylcellulose, organically modified clays, and the like. The compositions can also contain perfumes, emollients, conditioning aids such as silica and its derivatives, etc., in order to provide pleasing cosmetics and aesthetic benefits. It should be noted, however, that amines, quaternary ammonium materials and zwitterionic materials are desirably avoided since they interfere with the action of the monpersulfate salt, and it is, of course, desirable not to have diol, polyol, tertiary or secondary alcohols, etc., present since they react with the monoperulfate.

The compositions of this invention, depending upon their components, can be used either as shampoos or in combination with shampoos as cleaning and/or conditioning aids. Thus, if there is little surfactant present, the compositions would normally be used after shampooing the hair as a cream rinse. On the other hand, if there is a substantial amount of surfactant present, the compositions of this invention can be used as shampoos, or in combination with shampoos, to clean the hair.

The following examples are intended to illustrate the compositions of this invention without being limiting.

EXAMPLE I

The following compositions are prepared by milling the "Oxone" and the alkaline buffer (sodium carbonate) to give an average particle size of between about 15 and 50 microns and then thoroughly dispersing these solid materials in the remaining constituents:

A. A composition is prepared containing about 10% "Oxone"; about 7.5% sodium carbonate; about 41.25% polyethoxylated (4) dodecanol; and the balance of polyethoxylated (23) dodecanol.

B. A composition is prepared containing about 7.5% "Oxone"; about 3.5% sodium carbonate; about 50% sodium coconut alkyl sulfate; and the balance ethoxylated (30) fatty alcohol ($C_8$–$C_{14}$).

C. A composition is prepared containing about 25.4% "Oxone"; about 12.7% sodium carbonate; about 25.4% sodium alkyl (50% $C_{12}$–50% $C_{14}$) sulfate; about 0.5% perfume; about 0.2% colors; and the balance polyethoxylated (5) tridecanol.

D. A composition is prepared containing about 10% "Oxone"; about 7.2% of a 2.1 mixture of sodium carbonate and sodium bicarbonate; about 45% sodium coconut alkyl polyethoxylated (3) sulfate; about 0.4% sodium carboxymethylcellulose; about 0.5% perfume; and the balance a polyethoxylated (30) tridecanol.

E. A composition is prepared containing about 9.46% "Oxone"; about 5% sodium carbonate; about 45% sodium alkyl (3:2 $C_{12}$:$C_{14}$) sulfate; about 2.6% Syloid 244 silica aerogel; and the balance triacetin.

F. A composition is prepared containing about 20% "Oxone"; about 10% sodium carbonate; about 15% sodium coconut alkyl sulfate; about 7% dodecanol; about 0.5% perfume; and the balance triacetin.

G. A composition is prepared containing about 10% "Oxone"; about 5% sodium carbonate; about 35% sodium coconut alkyl sulfate; about 3% dodecanol; about 0.6% perfume; about 0.5% colors; and the balance triacetin.

EXAMPLE II

The following compositions are prepared by milling and screening the oxidant and the alkaline buffer to give average particle diameters of about 40 microns with no particles larger than 75 microns, the remaining ingredients are then thoroughly mixed and combined with the powdered ingredients.

A. A composition is prepared containing about 10% $KHSO_5$; about 15% potassium pyrophosphate; about 40% mineral oil (SSF–60); about 0.8% perfume; about 0.3% color; and the balance sodium coconut soap.

B. A composition is prepared containing about 1% $NaHSO_5$; about 1% sodium orthophosphate; about 30% mannitol hexaacetate; about 30% of a polyethoxylated (20) nonyl phenol; about 1% perfume; and the balance sodium coconut acyl sarcosinate.

C. A composition is prepared containing about 1% "Oxone"; about 10% disodium hydrogen orthophosphate; about 15% mineral oil (SSF–500); about 30% polyethoxylated (100) polypropylene glycol (M.W. 1,500); and the balance sodium polyethoxylated (3) coconut fatty alcohol sulfate.

D. A composition is prepared containing about 20% "Oxone"; about 15% anhydrous sodium borate; about 15% coconut fatty alcohol; about 0.1% perfume; and the balance sodium coconut alkyl glyceryl ether sulfonate.

E. A composition is prepared containing about 5% $LiHSO_5$; about 0.5% NaOH; about 5% $Na_2SO_4$; about 49.5% ethanol; about 10% N-coconutalkyl-N,N-dimethylamine oxide; about 10% sodium dodecylbenzene sulfonate; about 0.8% Veegum; and the balance hexadecanol.

F. A composition is prepared containing about 2% $C_5HSO_5$; about 2% sodium tripolyphosphate; about 46% polyethoxylated (150) polypropoxylated ethylene diamine (M.W. 2,600); and the balance coconut oil.

G. A composition is prepared containing about 3% $RbHSO_5$; about 10% sodium sulfate; about 4% sodium pyrophosphate; about 23% hydrogenated tallow (I.V. 8); about 20% dibutyl propylene glycol ether; about 10% 3-[N,N - dimethyl-N-hexadecylammonio]-2-hydroxypropane-1-sulfonate; about 2% perfume; and the balance polyethoxylated (60) hexadecanol.

H. A composition is prepared containing about 20% "Oxone"; about 10% of a 1:1:1 mixture of sodium carbonate, sodium borate, and sodium bicarbonate; about 20% ethanol; about 10% cetyl alcohol; about 10% dodecylmethyl sulfoxide; about 5% dimethyldodecylphosphine oxide; and the balance polyethoxylated ethylene glycol (M.W. 10,000).

I. A composition is prepared containing about 15% "Oxone"; about 15% of a 1:1 mixture of sodium bicarbonate and sodium orthophosphate; about 40% sorbitol tetraacetate; about 10% N-hexadecyl-N,N-dimethyl betaine; and the balance polyethoxylated (30) tridecanol.

J. A composition is prepared containing about 18.6% "Oxone"; about 12% sodium acid pyrophosphate; about 5% sodium carbonate; about 20% of the coconut fatty acid diacetic ester of glycerine; and the balance sodium coconut alkyl sulfate.

K. A composition is prepared containing about 20% "Oxone"; about 10% sodium carbonate; about 10% sodium coconut acyl isethionate; about 10% sodium $C_{12}$ olefin sulfonate; about 5% sodium coconut soap; about 1% sodium coconut acyl methyl taurate; and the balance polyethylene oxide (M.W. 6,000).

L. A composition is prepared containing about 18.3% "Oxone"; about 10% of a 3:1 mixture of sodium carbonate and potassium bicarbonate; about 40% isopropanol; about 4% "Cab-O-Sil" (fumed silica); and the balance cetyl alcohol.

M. A composition is prepared containing about 19.1% "Oxone"; about 12% sodium carbonate; about 10% sodium sulfate; about 20% cetyl alcohol; about 20% coconut oil; and the balance sodium tallow alkyl sulfate.

All percentages, ratios and parts herein are by weight unless otherwise specified.

All of the above examples provide a conditioning benefit to the hair when applied to wet hair or when added to water and then added to hair.

What is claimed is:

1. An anhydrous, water-dispersible, hair treating composition comprising from about 0.5% to about 10% by weight of an oxidant having the formula $MHSO_5$ wherein M is an alkali metal cation, wherein said oxidant has a particle size of from about 1 to about 840 microns; from about 15% to about 99% of a compatible organic diluent selected from the group consisting of liquid or soft waxy saturated hydrocarbons, liquid or soft waxy saturated fluorohydrocarbons, liquid or soft waxy saturated primary alcohols, liquid or soft waxy saturated esters of alcohols and fatty acids where said alcohols contain from 1 to 6 hydroxy groups, liquid or soft waxy saturated polyoxyalkylene ethers of alcohols containing from 1 to 6 hydroxy groups, and mixtures thereof; and from about 0.5% to about 15% of a compatible alkaline buffer, the pH of said composition when it is added to water being from about 7 to about 11.

2. The composition of Claim 1 wherein the pH of said composition when it is added to water is from about 8.5 to about 9.

3. The composition of Claim 1 containing from about 5% to about 50% of a water-soluble surface-active agent selected from the group consisting of soaps and anionic, amphoteric and zwitterionic synthetic detergents.

4. The composition of Claim 1 containing from about 2% to about 10% of the oxidant and from about 2% to about 10% of the alkaline buffer.

5. The composition of Claim 4 containing from about 10% to about 20% of a water-soluble surface-active agent selected from the group consisting of soaps and anionic, amphoteric, and zwitterionic synthetic detergents.

6. The composition of Claim 1 wherein the oxidant is present as the stable, complex salt $$2KHSO_5 \cdot KHSO_4 \cdot K_2SO_4$$

7. The composition of Claim 1 wherein the organic diluent is selected from the group consisting of nonionic detergents; ethanol; coconut fatty alcohol; lauryl alcohol; cetyl alcohol; acetate esters wherein the alcohol group contains from 2 to about 18 carbon atoms and from 1 to about 6 hydroxy groups; mineral oil having a viscosity at 75° F. of from about 50 to about 700 Saybolt Seconds Furol (SSF); and saturated triglycerides of $C_8$–$C_{18}$ fatty acids.

8. The composition of Claim 1 wherein the alkaline buffer is selected from the group consisting of alkali metal and alkaline earth metal hydroxides, bicarbonates, carbonates, phosphates, and borates.

9. The composition of Claim 1 containing from about 5% to about 50% of a surface-active agent selected from the group consisting of alkali metal alkyl sulfates containing from about 8 to about 16 carbon atoms, alkyl glyceryl ether sulfonates wherein the alkyl group contains from about 8 to about 16 carbon atoms, N-acyl sarcosinates wherein the acyl group contains from about 8 to about 16 carbon atoms, and N-acyl, N-methyl taurides wherein the acyl group contains from about 8 to about 16 carbon atoms.

References Cited
UNITED STATES PATENTS 3,378,444   4/1968   Swanson    424—62
3,679,347   7/1972   Brown    8—10.1

SAM ROSEN, Primary Examiner

U.S. Cl. X.R.

424—62